United States Patent Office 2,868,764
Patented Jan. 13, 1959

2,868,764

POLYCHLOROPRENE ELASTOMERS

Sylvain M. Hirsty, Louisville, Ky., assignor to E. I. du Pont de Nemours and Company, Wilmington, Del., a corporation of Delaware No Drawing. Application November 14, 1956
Serial No. 622,006

4 Claims. (Cl. 260—45.8)

This invention relates to elastomeric polychloroprenes and more particularly to a method of stabilizing such elastomers against changes in plasticity on storage.

Freshly isolated plastic polychloroprene loses its plasticity, sometimes very rapidly, on standing, unless stabilizers are added. Antioxidants are usually used as stabilizers, and certain other classes of compounds, such as tetraalkyl thiuram disulfides, phenothiazine, amines, etc., have been occasionally employed. As the uses of polychloroprene elastomers have developed, stricter requirements for maintaining the plasticity between narrow limits during long periods of storage have been established, making it necessary to improve the stability of the isolated polychloroprene. This is particularly the case with elastomers made by polymerizing chloroprene in aqueous emulsion systems and especially in those containing mixed ammonium and alkali metal rosinates as emulsifying agents from which the polymer is isolated by evaporation of the water. During the drying step, the ammonium rosinates decompose and the alkali metal rosinates remain in the finished polymer and act as stabilizers. However, it has been found that when present in proportions large enough to give the desired stability, these metal rosinates give undesirable effects and the conventional stabilizers do not give the desired degree of stability to polychloroprenes isolated from such systems.

It is therefore an object of the present invention to provide a method for stabilizing polychloroprene elastomers against changes of plasticity on storage, and more particularly to intimately incorporate in polychloroprene elastomers a small amount of phenothiazine together with a small amount of an organic phosphite.

While the addition of organic phosphites to polychloroprene has been found to cause an undesirable increase in the plasticity of the polychloroprene elastomers upon standing, I have now found that polychloroprene may be stabilized against thermal and oxidative deterioration by incorporating therein, based on the weight of the polychloroprene, from 0.005% to 0.015% of phenothiazine and 0.05% to 0.5% of an organic phosphite of the formula $(RO)_3P$, in which R is a radical of the group consisting of alkyl radicals and aralkyl radicals containing a single benzene ring, said radicals containing from 4 to 16 carbon atoms, in which the R's in any particular molecule may be the same or different radicals. By the use of the combination of these two ingredients, the polychloroprene elastomers are stabilized to the extent that they undergo substantially no change in plasticity over extended periods of aging and may therefore be stored for long periods of time prior to use.

These stabilizing ingredients (that is, the phosphite and the phenothiazine) are preferably added to the polymers while these are still dispersed in water, and when this is done they are themselves usually first dispersed separately in water and this dispersion is then added to the polymer dispersion. The stabilizers are thus uniformly incorporated in the polymer before it is isolated in solid form. The stabilizing ingredients are conveniently first dissolved in an organic solvent, such as toluene, to aid their dispersion in water.

The phosphites used in the present invention may be alkyl or aralkyl phosphites in which the three organic radicals attached to the phosphite group may be the same or different. These radicals preferably contain from four to sixteen carbon atoms. The alkyl groups may be attached to aryl radicals or directly to the phosphite groups, and may be either straight or branched chain. Tributyl phosphite, trioctyl phosphite, trilauryl phosphite, tricetyl phosphite, trixylyl phosphite, tri(diisobutylphenyl) phosphite, etc., exemplify the type of phosphites contemplated.

The preferred proportions of phenothiazine and of the phosphite are about 0.01 part each per 100 parts of chloroprene. Much larger amounts of phenothiazine cause considerable decrease in plasticity on aging. On the other hand, varying the amount of the phosphite between 0.005 and 0.5 produces little variation in the results.

This invention is applicable to all types of plastic polychloroprene, but is particularly useful when the polymer is made in the presence of an alkyl mercaptan and isolated by drum drying.

In the following examples, which are given to more fully illustrate the invention, a particular emulsion system is of course employed although it is to be understood that this is merely illustrative since the invention is not limited to a particular type of emulsion polymerization. The parts used are by weight unless otherwise specified.

EXAMPLES

The dispersion of the polychloroprene to be stabilized is made by emulsifying 100 parts of chloroprene containing 3 parts of disproportionated rosin and 0.25 part of dodecyl mercaptan in 118 parts of water containing 1.3 parts of ammonia, 0.1 part of potassium hydroxide and 0.05 part of potassium sulfite, and polymerizing at 40° C. with the addition of small amounts of ammonium persulfate solution as needed to maintain the desired rate of polymerization. When approximately 70% of the chloroprene has polymerized, further polymerization is arrested by adding 0.01 part of phenothiazine and 0.01 part of monotertiary butyl metacresol dissolved in 0.66 part of toluene and dispersed in 0.31 part of water containing a dispersing agent made by condensing 12 mols of ethylene oxide per mol of lauryl alcohol. The unpolymerized chloroprene is then removed along with other volatile components by passing the latex together with steam at 150° mm. pressure through a tube under conditions of turbannular flow and allowing it to discharge into a receiver in which the stripped polychloroprene dispersion (latex) is separated from the excess steam, unchanged chloroprene, etc., as more specifically described in U. S. Patent 2,467,769. The polymer is isolated from this dispersion by applying it continuously to the nip between the rolls of an 8-inch chromium-plated double drum drier, heated by steam at 35 p. s. i. g. and operating at 20 R. P. M. Sheets of dry, light-colored polymer are removed from the rolls by "doctor knives." The ammonium salts present in the latex are decomposed by this treatment.

The laboratory test used for determining the stability of the elastomers consists in determining the change in the Williams plasticity number during accelerated aging at 70° C. Plasticity numbers are determined by the methods described by I. Williams in Industrial and Engineering Chemistry, vol. 16, page 362 (1924). Aging for one day at 70° C. produces approximately the same effect as one month at ordinary temperatures. A polymer which shows a change of less than 10 points in plasticity number after aging for 10 days at 70° C. has been found to show no significant change in plasticity number after storage for six months, either at 25° C. (room temperature) or at 38° C. which is well above the highest average temperature at which such materials are normally stored.

*Example 1*

A polychloroprene dispersion made as above described, to which 0.01 part of a mixed phosphite ester consisting predominantly of di-2-ethylhexyl octyl phenyl phosphite and ethylhexyl dioctylphenyl phosphite, the rest being tri-2-ethylhexyl phosphite and trioctylphenyl phosphite was added along with the phenothiazine, gives a polymer which, when isolated as above, decreases in Williams plasticity number by only 2 points (from an original value of 105) when stored for 10 days at 70° C., and shows a decrease of only 3 points in 20 days. This is close to the experimental error. On the other hand, when no agent of any kind is added, the plasticity number decreases 14 points in one day and then increases rapidly, being 20 points above the original value at the end of 6 days. When the phenothiazine and butyl cresol are used without the phosphite, the plasticity number increases 11 points in 10 days. With the phosphite alone, there is a decrease of 19 points.

Samples of the product of this example have shown no significant change in plasticity number after storage for 6 months either at 25° C. (room temperature) or at 38° C. which is well above the highest average temperature at which the material would be stored in actual practice.

*Example 2*

When tricresyl phosphite is used in place of the mixed phosphite in Example 1, there is a 3 point increase in plasticity number in 10 days at 70° C.

*Example 3*

When tri-2-ethylhexyl phosphite is used in place of the mixed phosphites in Example 1, there is a 3 point decrease in plasticity number in 10 days at 70° C.

I claim:

1. A process for stabilizing polychloroprene against thermal and oxidative deterioration, which comprises incorporating therein, based on the weight of the polychloroprene, from 0.005% to 0.015% of phenothiazine and from 0.005% to 0.5% of an organic phosphite of the formula $(RO)_3P$ in which R stands for radicals of the group consisting of alkyl radicals and aralkyl radicals containing a single benzene ring, said radicals containing 4 to 16 carbon atoms.

2. A process for stabilizing polychloroprene against thermal and oxidative deterioration, which comprises incorporating therein, based on the weight of the polychloroprene, 0.01% of phenothiazine and 0.01% of a trialkyl phosphite in which the alkyl groups contain from 4 to 16 carbon atoms.

3. A polychloroprene elastomer stabilized against thermal and oxidative deterioration by the process of claim 1.

4. A polychloroprene elastomer stabilized against thermal and oxidative deterioration by the process of claim 2.

References Cited in the file of this patent

UNITED STATES PATENTS

| | | |
|---|---|---|
| 1,950,438 | Carothers et al. | Mar. 13, 1934 |
| 2,115,896 | Wiezevich | May 3, 1938 |
| 2,733,226 | Hunter | Jan. 31, 1956 |
| 2,750,351 | Baer | June 12, 1956 |